May 8, 1928.

J. F. LANDT

DETACHABLE FOLDING SCREEN

Filed Feb. 10, 1927

1,668,849

INVENTOR:
John F. Landt
BY David E. Carlsen
ATTORNEY.

Patented May 8, 1928.

1,668,849

UNITED STATES PATENT OFFICE.

JOHN F. LANDT, OF ST. PAUL, MINNESOTA.

DETACHABLE FOLDING SCREEN.

Application filed February 10, 1927. Serial No. 167,160.

My invention relates to a window screen particularly adaptable for the windows of motor vehicles, and the object is to provide a simple, efficient and collapsible screen which is readily placed in the window opening of a car whether the glass is up or not and which may be detached from said opening, folded up in a minimum unobstructive place.

In the accompanying drawing.

Figure 1:
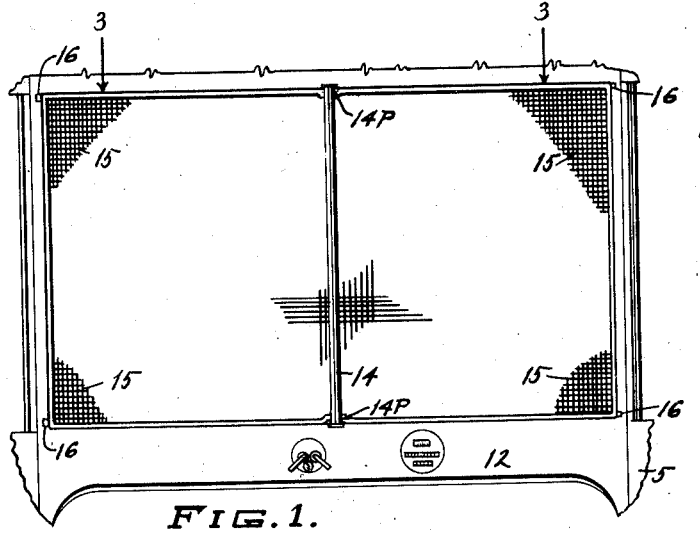
Fig. 1 is an inside elevation of the windshield and adjacent parts of an automobile and showing my improved screen in operative position.
Figure 3:
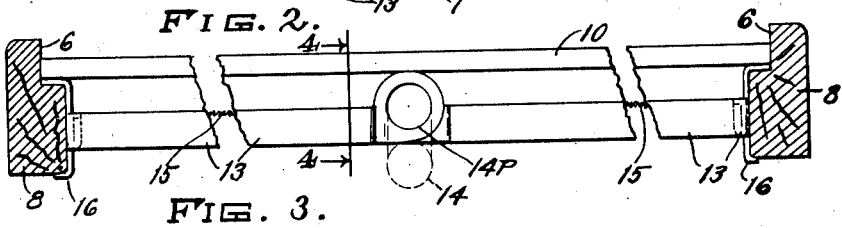
Fig. 3 is an enlarged top view of one of my screens and some adjacent window frame parts in section, about as on line 3—3 in Fig. 1.

Referring to the drawing by reference numerals, 5 designates a car body having window openings, 6, either in the body or the doors, 7 and 8 in Figs. 1, 3 and 4 designates the wind shield frame suitably hinged as at 8 (Fig. 4), 10 represents the glass pane in any of the openings (may be fixed in a frame 11, slidable vertically into or out of any of the openings but hinged in the windshield), 12 is the instrument board of an automobile just below the windshield forward of the driver's seat.

My device consists of a quadrangular metal frame 13, of a size to fill any car door or window opening and is divided preferably in two sections by a vertical rod member 14 the upper and lower ends of which are pivotally secured at $14^P$ to the upper and lower screen frame members. The frame members 13 are preferably made of flat bar metal folded over to frictionally clamp the edges of the screen 15. 16 are shallow U or channel shaped clips fixed on the outer faces of the vertical frame members 13, and opening outwardly to engage the adjacent vertical window frame members 8 of the car, as best shown in Fig. 3.

Figure 4:
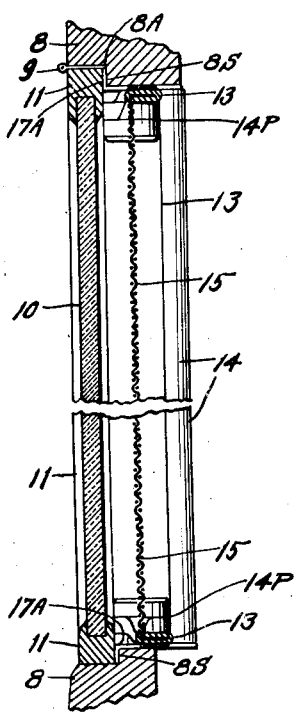
Fig. 4 is a vertical section near the center of the screen, about as at line 4—4 in Fig. 3.
Figure 2:
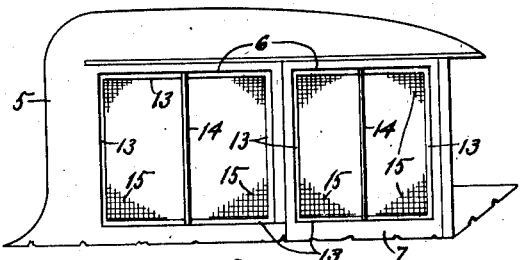
Fig. 2 is a side elevation, a portion of an automobile with two of my devices in operative position on its two windows.

In Fig. 4, $8^A$ is a recess in the window opening internally of which the opening is reduced and forms a shoulder $8^S$. These shoulders are engaged externally by L-shaped clips 17 fixed on the horizontal members 13 of my device and which have each its short arm $17^A$, extending outwardly. These clips 17—$17^A$, hold the horizontal edges of the screen in fixed position simultaneously as the clips 16 engage the vertical window frames.

In placing one of my screens in a window opening it is spread out almost its full width so that the end clips 16 are aligned to be close to opposite the vertical window frame members. The lower clips 17 are then hooked over the lower horizontal edge or shoulder $8^S$ of the window frame as the upper edge of the screen is pressed toward the window opening and sprung downwardly enough to get the upper hook arms $17^A$ to engage the upper and outwardly exposed face of the shoulder $8^S$. This springing action on the screen is facilitated by pulling inwardly on the center part of the hinge bar 14 as the screen is straightened out to a vertical plane and assumes its position inwardly of the window and in a plane parallel thereto. The screen is also readily removable by first bending bar 14 inwardly to shorten the distance between the top and bottom frame members 13, so that clips $17^A$ can first be disengaged and the screen frame subsequently pulled inwardly by gradually swinging the ends of the screen sections toward each other. Then the screen is released and can be folded up and placed under a seat or any other convenient place in the car. It is obvious that these types of screens serve a very useful purpose for car owners who park their cars in suburban districts, at lakes and camps, to keep insects out of a car and the screens also serve as a windbreak.

It will be understood that a single piece of screen only is used and arranged in front of the bar 14, approximately on a common plane with the centers of the hinges $14^P$. Wire screen or cloth screen may be used. The screen sections, are of course, folded toward each other in a direction away from the pivot rod 14.

I claim:

1. A screen of the class described comprising a quadrangular frame divided in two parts hingedly joined on a hinge bar, a single continuous screen retained in said frame and passing in front of said hinge bar, outwardly directed clips fixed on the four outer sides of said frame and adapted to frictionally engage the corresponding window frame members to hold the screen in fixed vertical position, in which said hinge bar is a spring bar normally straight but adapted to be sprung to reduce the distance between the upper and lower screen frame members for the purpose described.

2. A screen of the class described comprising a quadrangular frame divided in two parts hingedly joined on a hinge bar, a single continuous screen retained in said frame and passing in front of said hinge bar, outwardly directed clips fixed on the four outer sides of said frame and adapted to frictionally engage the corresponding window frame members to hold the screen in fixed vertical position, said clips on the horizontal bars being of L-shape and the clips on the vertical bars of a shallow U-shape, the former to engage horizontal window frame members at the outer edge and the latter to frictionally straddle the vertical window frame members.

In testimony whereof I affix my signature.

JOHN F. LANDT.